(12) United States Patent
Galon et al.

(10) Patent No.: US 10,623,896 B1
(45) Date of Patent: Apr. 14, 2020

(54) SYSTEM AND METHOD FOR DETERMINING TRANSIT STOP LOCATION

(71) Applicant: MOOVIT APP GLOBAL LTD., Ness Ziona (IL)

(72) Inventors: Binyamin Galon, Tzur Hadassah (IL); Nir Bezalel, Rehovot (IL); Roy Bick, Kfar Saba (IL)

(73) Assignee: MOOVIT APP GLOBAL LTD., Ness Ziona (IL)

( * ) Notice: Subject to any disclaimer, the term of this patent is extended or adjusted under 35 U.S.C. 154(b) by 0 days.

(21) Appl. No.: 16/313,480

(22) PCT Filed: Jun. 18, 2018

(86) PCT No.: PCT/IL2018/050674
§ 371 (c)(1),
(2) Date: Dec. 27, 2018

(87) PCT Pub. No.: WO2018/235075
PCT Pub. Date: Dec. 27, 2018

Related U.S. Application Data (60) Provisional application No. 62/521,451, filed on Jun. 18, 2017.

(51) Int. Cl.
| | |
|---|---|
| *H04W 4/02* | (2018.01) |
| *G01C 21/34* | (2006.01) |
| *H04W 4/029* | (2018.01) |
| *G08G 1/123* | (2006.01) |
| *G01C 21/36* | (2006.01) |

(52) U.S. Cl.
CPC ........ *H04W 4/023* (2013.01); *G01C 21/3407* (2013.01); *G01C 21/3679* (2013.01); *G08G 1/123* (2013.01); *H04W 4/029* (2018.02)

(58) Field of Classification Search
USPC ...................................... 455/456.3
See application file for complete search history.

(56) References Cited

U.S. PATENT DOCUMENTS 9,778,345 B2 * 10/2017 Jouaux ................ G06Q 10/047
9,930,120 B2 * 3/2018 Gutierrez ................ H04L 67/12
(Continued)

FOREIGN PATENT DOCUMENTS

| EP | 3128292 | 2/2017 |
|---|---|---|
| WO | 2013192583 | 12/2013 |

OTHER PUBLICATIONS

International Search Report and Written Opinion from PCT/IL2018/050674 filed Jun. 18, 2018.
(Continued)

*Primary Examiner* — Shahriar Behnamian
(74) *Attorney, Agent, or Firm* — A.C. Entis-IP Ltd.; Allan C. Entis; Kenichi N. Hartman (57) ABSTRACT

A method for determining a location of a transit stop for a transit system, the method comprising: registering a plurality of entries of device location data of a plurality of mobile computing devices, each entry of the plurality of entries comprising a geographical coordinate of a mobile computing device at a time the mobile computing device displayed information relating to the transit stop; and determining a transit stop location responsive to the registered entries of device location data.

20 Claims, 7 Drawing Sheets

(56) References Cited

U.S. PATENT DOCUMENTS

| | | | | |
|---|---|---|---|---|
| 2005/0131625 A1* | 6/2005 | Birger | ................... | G06Q 10/08 |
| | | | | 701/117 |
| 2011/0148623 A1 | 6/2011 | Bishop et al. | | |
| 2013/0041941 A1* | 2/2013 | Tomasic | ................ | G08G 1/123 |
| | | | | 709/203 |
| 2018/0077523 A1* | 3/2018 | Herrera | .................. | G01S 13/74 |

OTHER PUBLICATIONS

Kataro Hara et al.,Improving Public Transit Accessibility for Blind Riders by Crowdsourcing Bus Stop Landmark Lcoations with Google Street View: An Extended Analysis, ACM Transactions on Accessible Computing, ACM, vol. 6, No. 2, Mar. 9, 2015.

\* cited by examiner

SYSTEM AND METHOD FOR DETERMINING TRANSIT STOP LOCATION

The present application is a US National Phase of PCT Application No. PCT/IL2018/050674, filed on Jun. 18, 2018, which claims benefit under 35 U.S.C. 119(e) from U.S. Provisional Application 62/521,451 filed Jun. 18, 2017, whose respective contents and disclosures are incorporated herein by reference in their entirety.

BACKGROUND

Finding the right bus stop is a necessary step for a user of a bus transportation system to effectively use the system for travel, but it can be difficult in practice. Bus stops are relatively small, sometimes consisting of merely a single bench and a sign, or even less. A given stretch of road may comprise multiple bus stops that are far enough apart so that a traveler has to make a choice as to which stop to wait at for the correct bus, while the stations are sufficiently similar in appearance so that discerning which the right bus stop is either is not possible or takes substantial effort. In addition, because a bus station is relatively small and easy to assemble and disassemble, its location is subject to change, due to, for example, road construction or an updated bus route. Similar problems can exist in other transit systems, in which a fleet of vehicles (such as but not limited to shuttlebuses, cars, and boats) pick up and let off riders at designated transit stops, typically in accordance with a schedule.

Computer-based applications ("transit apps") help users navigate a transit system by providing schedules, assistance for trip planning, and mapping of routes and transit stops. By way of example, a transit app user can query and access through a transit app information regarding particular routes and/or transit stops.

SUMMARY

The small size of typical bus stop and the occurrence of changes in bus routes and bus stop location presents a challenge for a transit app to consistently have available to it bus stop locations of sufficient accuracy and consistency for optimal user satisfaction. Transit apps for other transit system, in which a fleet of vehicles (such as but not limited to shuttlebuses, cars, and boats) pick up and let off riders at designated transit stops, typically in accordance with a schedule, may face similar issues.

An aspect of an embodiment of the disclosure relates to providing a method that robustly determines locations of stops for a transit system responsive to user-provided ("crowdsourced") location data. Hereinafter, the transit stop location determination method in accordance with an embodiment of the disclosure may be referred to as a "stop location crowdsourcing" or "SL crowdsourcing" method. Another aspect of an embodiment of the disclosure is a system, which may be referred to herein as a "SL crowdsourcing system", that is operable to perform a SL crowdsourcing method in accordance with an embodiment of the disclosure.

In an embodiment of the disclosure, the SL crowdsourcing method comprises: registering device location data of a plurality of mobile computing devices (which may be also referred to herein as "mobile devices") when each of the plurality of mobile computing devices displays information relating to a stop; and determining an updated transit stop location responsive to the registered device location data. For convenience of presentation, a location of a device when the device is displaying information relating to a given transit stop may be referred to herein as a "stop-lookup location" for the given transit stop, and data relating to the stop-lookup location may be referred to herein as "stop-lookup data".

A transit app may be operable to generate a page ("a transit stop page") dedicated to providing information for a particular transit stop, by way of example, one or more of a name of the transit stop, a list of vehicles or service lines (such as bus routes) that stop at the transit stop, and estimated arrival times for buses scheduled to arrive. In an embodiment of the disclosure, displaying information relating to a transit stop comprises displaying a transit stop page. In an embodiment of the disclosure, the transit stop page includes real-time information relating to the transit stop, including a real-time list of vehicles that are expected to stop at the transit stop and real-time estimated arrival times for vehicles scheduled to arrive at the stop.

In an embodiment of the disclosure, the stop look-up data comprises, in addition to a stop-lookup location, one or more of: an ID (mobile device ID) of the mobile device, an ID (transit stop ID) of the transit stop for which information was displayed on the mobile device; a timestamp; and an accuracy of the stop-lookup location.

In an embodiment of the disclosure, the SL crowdsourcing method comprises: spatially clustering stop-lookup locations for the transit stop to identify a plurality of candidate clusters; determining a centroid for each of the plurality of candidate clusters and designating the plurality of centroids as a plurality of "candidate transit stop locations"; ranking the plurality of candidate transit stop locations to determine a "winning candidate transit stop location" most likely to reflect an actual transit stop location.

In an embodiment of the disclosure, the SL crowdsourcing method further comprises assessing if parameters of the winning candidate transit stop location meet threshold criteria for accuracy of data and/or likelihood of reflecting the actual transit stop location. Optionally, if parameters of the winning candidate transit stop location meets threshold criteria, the winning candidate transit stop location is designated as an "updated transit stop location". Optionally, if parameters of the wining cluster does not meet threshold criteria, the transit stop location is not updated.

In an embodiment of the disclosure, the SL crowdsourcing method further comprises one or more of: providing the updated transit stop location to a mobile device for display in the transit app; updating bus route information for the transit app responsive to the updated transit stop location; and providing the updated transit stop location to a bus transportation service provider.

In an embodiment of the disclosure, if the winning candidate transit stop location is determined to not meet threshold criteria, the method further comprises transmitting instructions to mobile devices to transmit more, or more accurate, stop-lookup locations for the transit stop.

Advantageously, a SL crowdsourcing method in accordance with an embodiment of the disclosure makes it possible to determine transit stop location with a relatively small amount of location data collected from individual mobile phones. As a result, for the mobile devices providing the location data, the SL crowdsourcing method can advantageously reduce: data transmission costs; drainage of batteries; and intrusions of privacy of the users.

Embodiments of the disclosure may be applied to any transit system having designated locations (transit stops) for passengers to get on and off a vehicle operated by the transit system. In accordance with an embodiment of the disclosure, the vehicle may be selected from the group consisting of a bus, a shuttlebus, a car, a van, a train, a boat, a ship, an aerial vehicle, or a train. Optionally, the transit vehicle is operated by a human operator and/or a computer-based autonomous system.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the following text of the detailed description, features of a SL crowdsourcing system and method are shown in FIGS. 1-4 and discussed with reference to the figures. While the Detailed Description refers primarily to a bus transit system having bus stops for passengers to get on and off a bus operated by the bus transit system, the disclosure herein is not limited to a bus transit system. Embodiments of the disclosure as described herein below may be applied to any transit system having transit stops for passengers to get on and off a vehicle operated by the transit system. In accordance with an embodiment of the disclosure, the vehicle may be selected from the group consisting of a bus, a shuttlebus, a car, a van, a train, a boat, a ship, an aerial vehicle, or a train. Optionally, the vehicle is operated by a human operator and/or a computer-based autonomous system.

Figure 1:
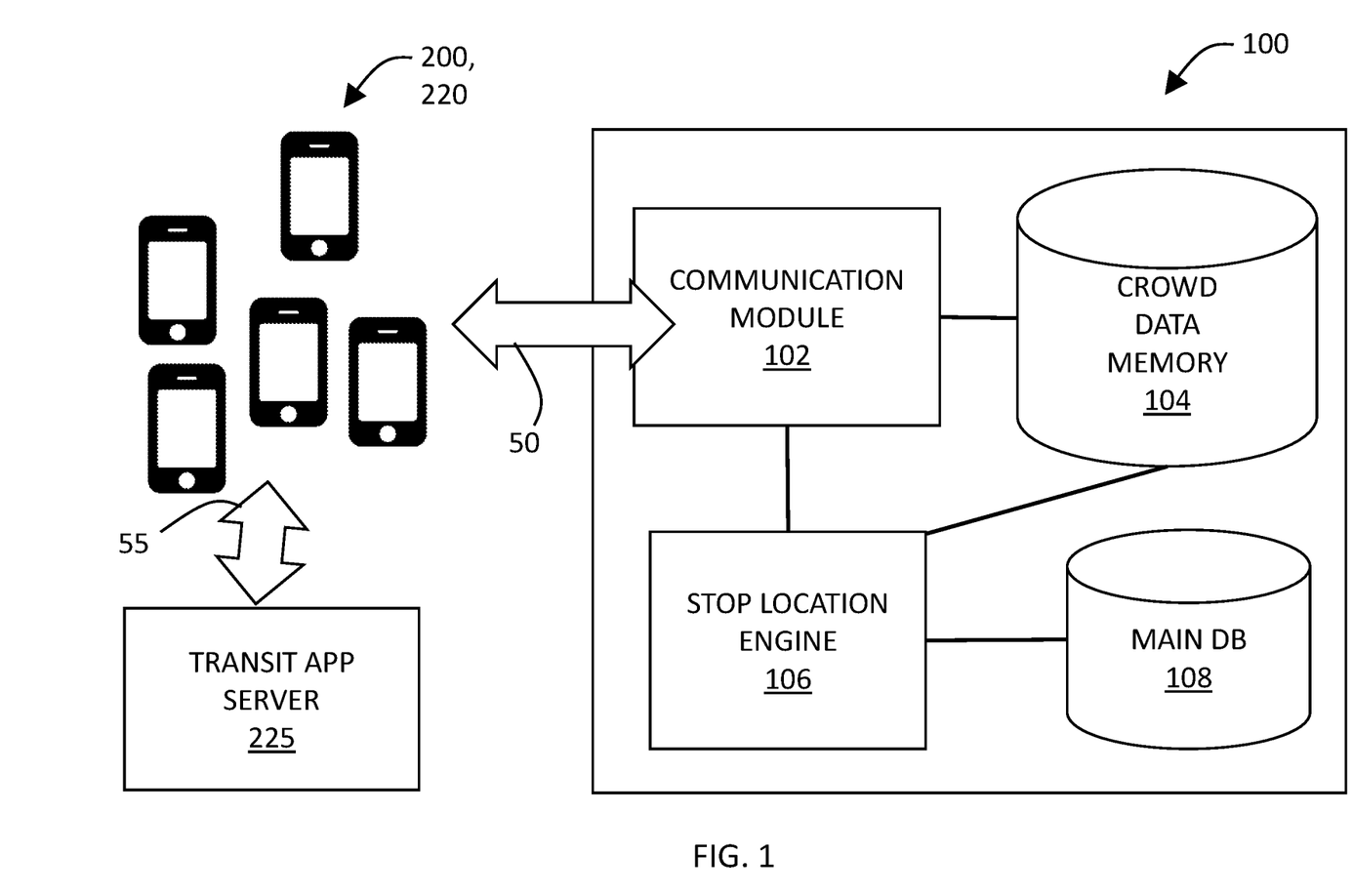
FIG. 1 schematically shows a SL crowdsourcing system communicating with a plurality of mobile devices, in accordance with an embodiment of the disclosure.

FIG. 1 shows an exemplary environment in which embodiments of the present disclosure are operable. SL crowdsourcing system 100 is operable to perform a SL crowdsourcing process in accordance with the present disclosure. SL crowdsourcing system 100 is a computer-based system that may comprise CPUs and/or microprocessors and memory as needed to provide and support processes in accordance with the disclosure. SL crowdsourcing system 100 and components thereof may comprise or be comprised in a server, a group of servers, or a distributed computing system, such as a cloud computing system.

SL crowdsourcing system 100 comprises communications module 102 that enables communication (schematically shown as double headed arrow 50) with mobile devices 200. The wireless communication between SL crowdsourcing system 100 and mobile devices 200 may be mediated through one or more of various wireless communication mediums known in the art, such as Wi-Fi and cellular communication networks. Mobile devices 200 may be one of various mobile devices known in the art, by way of example smartphones, tablet computers, and the like, that are equipped with components and instructions for tracking the location of the mobile device, for example through GPS signals, cellular network signals, and Wi-Fi signals.

Mobile devices 200 are also operable to download or be pre-installed with a transit app 220. Transit app 220 is operable to display on mobile device 200 information ("location-based transit information") relating to bus transportation that is responsive to the location of mobile device 200, which may be received by mobile devices 200 from a transit app server 225. The location-based transit information received by mobile devices 200 from transmit app server 225 is schematically illustrated as block arrow 55. Location-based bus information 55 includes, by way of example, locations of bus stops and information regarding operation of bus lines near the location of mobile device 200, such as bus lines stopping at a given bus stop and/or estimated arrival times of a given bus line at a given bus stop. Transit app 220 is also operable to generate a page ("a bus stop page") dedicated to providing location-based transit information for a particular bus stop. In an embodiment of the disclosure, displaying information relating to a bus stop comprises displaying a bus stop page. The bus stop page may provide location-based transit information in real-time, in that the information is regularly updated at a frequency that is easily perceived by a human user, for example at least once per minute, at least once per 30 seconds, at least once per 10 seconds, at least once per second or at least once per half-second. By way of example, the estimated arrival time of a bus at the bus stop as shown on the bus stop page may be regularly updated responsive to, by way of example, location-based data provided by the bus or current traffic conditions, and optionally provided via transit app server 225. Transit app 220 may generate a bus stop page responsive to receiving input from a user of the transit app indicating a request for information regarding a particular bus stop. The request for information may comprise, by way of example, selecting the particular bus stop from a list of nearby bus stop, or selecting an icon representing the particular bus stop that is shown on an electronic map generated by the transit app.

In an embodiment of the disclosure, transit app 220 is operable to generate an entry of stop-lookup data responsive to the transit app generating a bus stop page, and further to transmit said stop-lookup data entry to SL crowdsourcing system 100. In an embodiment of the disclosure, each entry for stop-lookup data comprises, in addition to a stop-lookup location, one or more of: a mobile device ID, a bus stop ID of the bus stop for which information was displayed; a timestamp; and an accuracy of the stop-lookup location.

In an embodiment of the disclosure, a stop-lookup location comprises longitude and latitude coordinates, as well as, optionally, altitude and/or accuracy. Optionally, stop-lookup location may be provided in accordance with a Global Navigation Satellite System (GNSS) by way of example Global Positioning System (GPS) or GLONASS. The location coordinates may be converted by SL crowdsourcing system 100 or prior to reception by the SL crowdsourcing system to be in accordance with a Euclidean CRS, by way of example a UTM system, in order to for the SL crowdsourcing system to perform geometric calculations with the stop-lookup locations.

Optionally, an accuracy of a stop-lookup location is a distance of a radius (which may be referred to herein as a "confidence radius") for a circle along a horizontal plane around the stop-lookup location at which there is a defined level of confidence that the true stop-lookup location is within the circle. The level of confidence may be a standard deviation (STD), by way of example a first STD (68% confidence), a second STD (95.45% confidence) or a third STD (99.73% confidence). As such, a higher value for a confidence radius indicates worse accuracy and a lower value for the confidence radius indicates better accuracy. In a particular embodiment, the accuracy is defined as a radius around the stop-lookup location defining a 68% confidence.

In an embodiment of the disclosure, as transit app 220 is utilized by users of mobile devices 200, mobile devices 200 intermittently transmit new entries of stop-lookup data to SL crowdsourcing system 100. Moreover, one mobile device 200 operating transit app 220 in accordance with an embodiment of the disclosure is operable to transmit an entry of stop-lookup data for one bus stop in a plurality of instances, over the course of a day or even a few minutes, depending by way of example on how often the user requests information for the bus stop or instructs the mobile device to generate or update a bus stop page for the bus stop.

Communication module 102 is operable to receive the transmitted stop-lookup data entries and forwards the data for storage in crowd data memory 104. Overtime, crowd data memory 104 amasses a store of many entries of stop-lookup data for a plurality of bus stops from a plurality of mobile phones over a period of time, which may be hours, days, months, or years.

In an embodiment of the disclosure, transmission of an entry of stop-lookup data by a mobile device 200, or registration of a transmission of a stop-lookup data transmission by a SL crowdsourcing system 100 from a particular mobile device 200, may be limited to a maximum number of instances per period of time, by way of example once every 5 minutes, so that the data set is not overly represented by users who opens a bus stop page with unusually high frequency.

Stop location ("SL") engine 106 comprised in SL crowdsourcing system 100 is operable to select stop-lookup data regarding a defined bus stop over a defined period of time and determine or update a location of the bus stop responsive to the stop-lookup data. SL engine 106 may comprise or be comprised in a microprocessor, or be a functional unit comprised in a computer system, which may be a distributed computing system, for example a cloud-based computing system.

Figure 2:
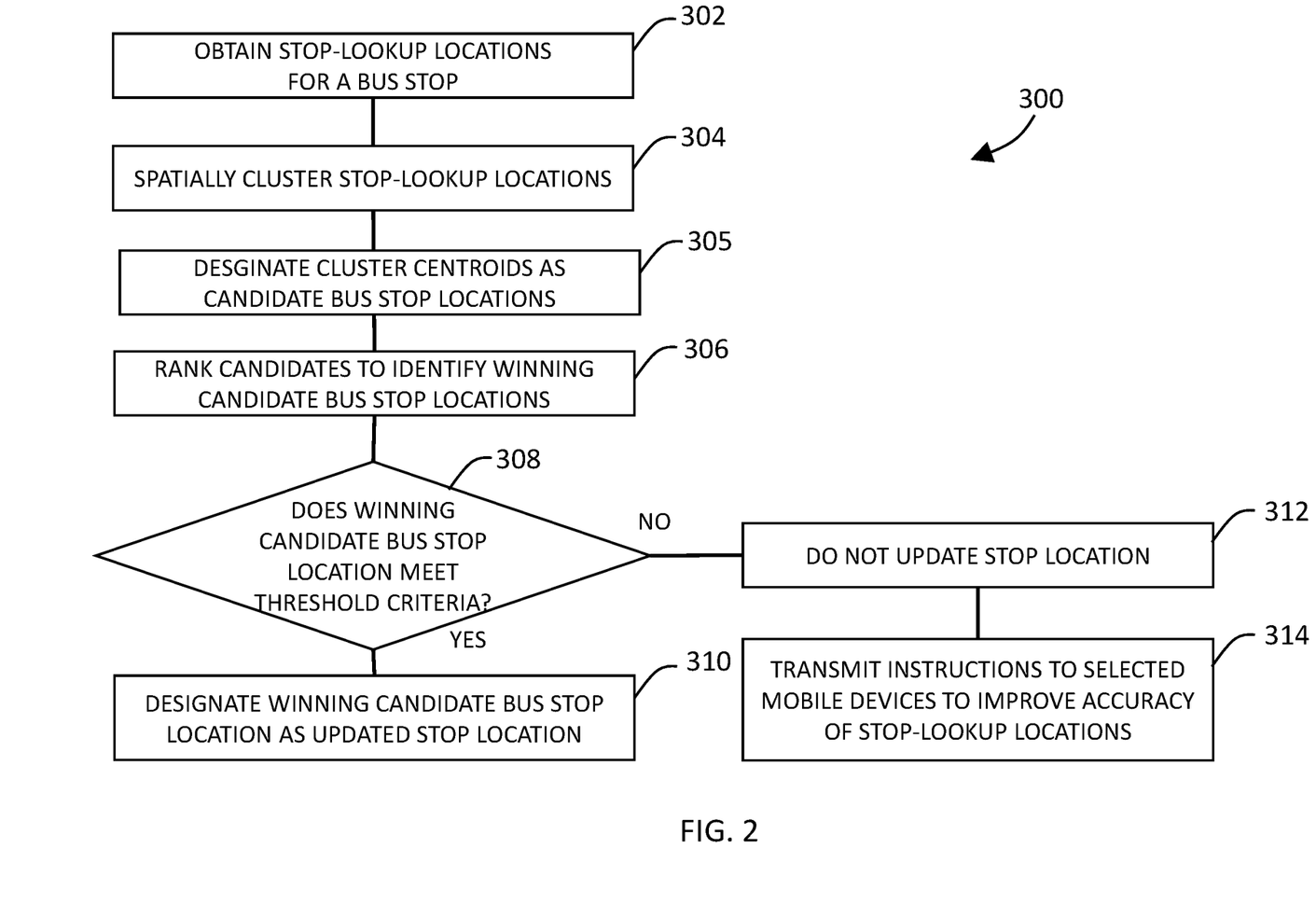
FIG. 2 shows a flowchart showing a SL crowdsourcing method in accordance with an embodiment of the disclosure.

Reference is now made to FIG. 2, which shows a flowchart for a SL crowdsourcing process 300 in accordance with an embodiment of the disclosure, as well as to addition to FIG. 1 schematically showing SL crowdsourcing system 100 operable to perform SL crowdsourcing process 300. In an embodiment of the disclosure, SL engine 106 determines or updates a location of the bus stop by implementing a SL crowdsourcing process 300 responsive to a set of instructions stored in a memory comprised in or operatively connected to SL engine 106. Optionally, the memory is crowd data memory 104, main DB 106, or another memory (not shown) comprised in or operatively connected to SL crowdsourcing system 100. SL crowdsourcing process 300 may be initiated for a given bus stop in response to one or more of a variety of triggers. The trigger optionally include an indication ("error indication") that a default bus stop location for example as stored in a main database ("main DB") 108 is incorrect. The error indication may comprise registering of complaints by transit app users or anomalous driving patterns by buses at or near the bus stop. Additionally or alternatively, the trigger includes a passing of a minimum user threshold for the given bus stop, by way of example as indicated by a number of transit app users opening a bus stop page for the bus stop. Additionally or alternatively, the trigger optionally includes a predetermined interval of time, such that, for every bus stop of a transit system, SL crowdsourcing system 100 periodically inspects and if needed updates the default bus stop location in accordance with SL crowdsourcing process 300.

In an embodiment of the disclosure, SL crowdsourcing process 300 comprises a block 302 comprising registering a set of stop-lookup data from crowd data memory 104. The registered stop-lookup data for subsequent analysis by SL engine 106 is selected based on a bus stop ID, in order to select for entries of stop-lookup data relating to a particular bus stop.

Figure 3A:
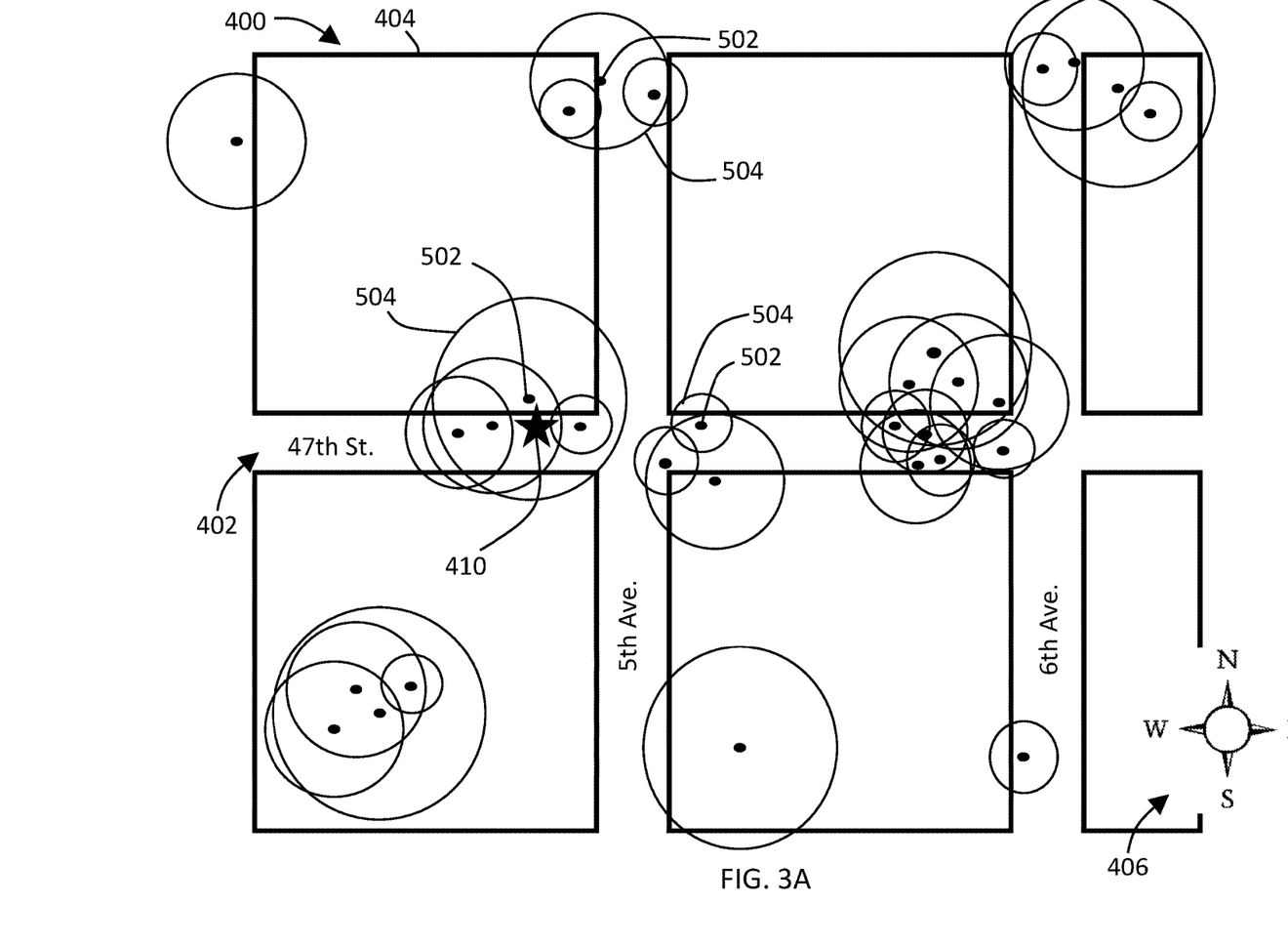
FIGS. 3A-3D schematically shows an overhead map of a few city blocks, the map indicating an old location of a bus stop, stop-lookup locations of mobile devices for the bus stop, and an updated location of the bus stop determined based on the stop-lookup locations in accordance with a SL crowdsourcing method in accordance with an embodiment of the disclosure.
Figure 3B:
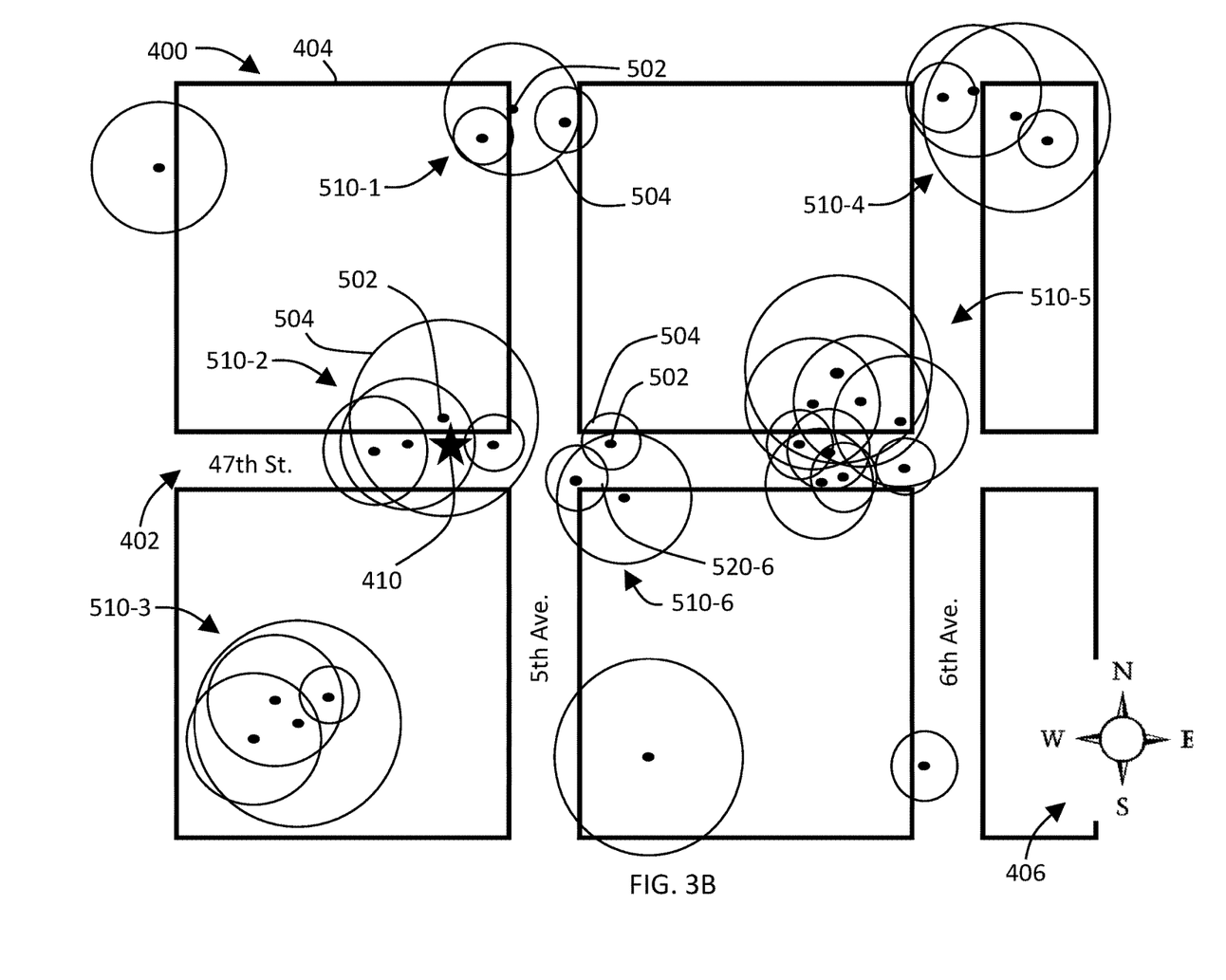
Figure 3C:
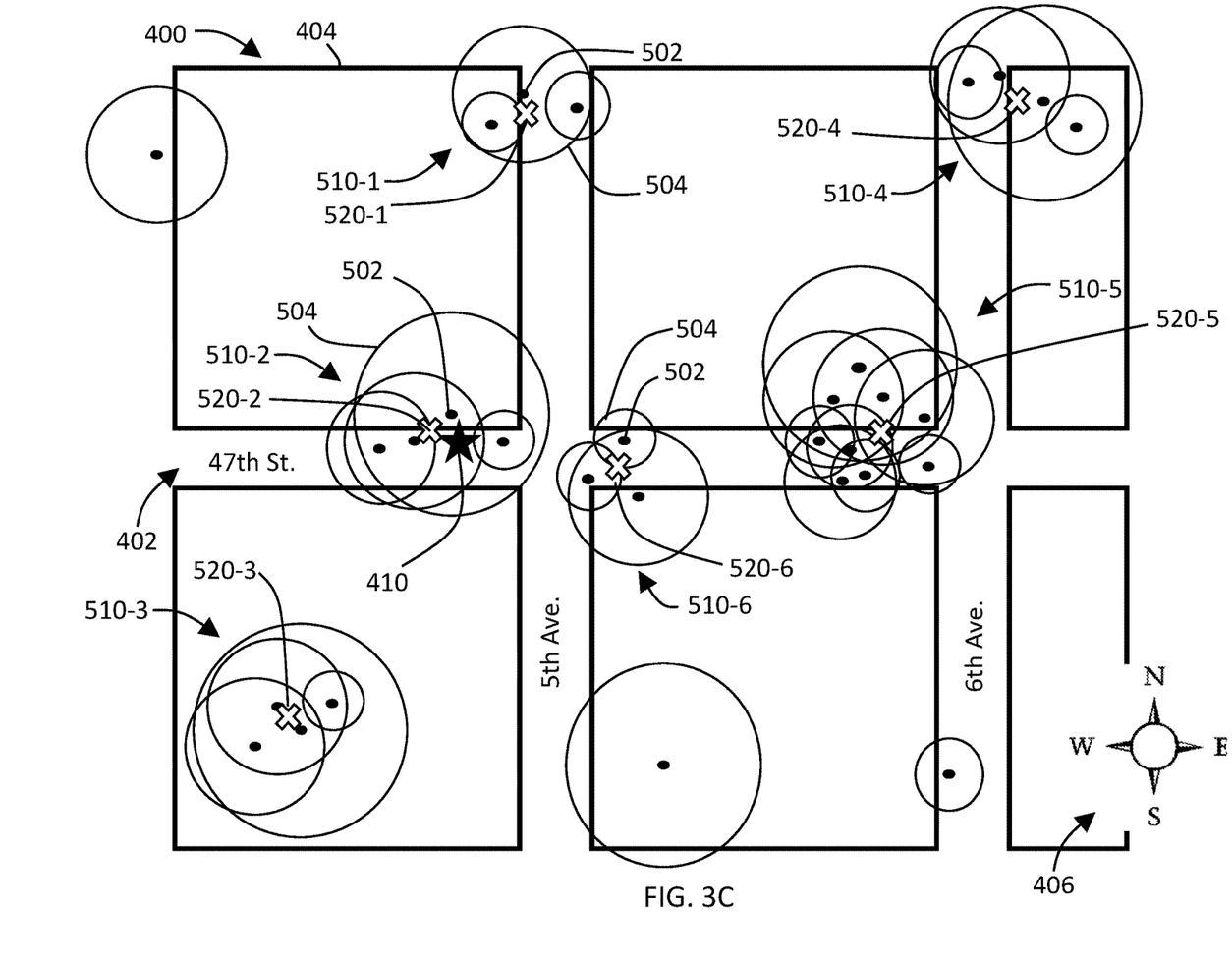

FIGS. 3A-3C schematically shows an example set of stop-lookup locations from stop-lookup data entries selected based on a particular bus stop ID for a bus stop named "the Diamond District stop", which are overlaid on a map 400 of a city neighborhood comprising streets 402 and blocks 404. A compass 406 is shown for reference of direction. FIGS. 3A-3C schematically show one street, $47^{th}$ St., arranged on an East-West axis, and two Avenues, $5^{th}$ Ave. and $6^{th}$ Ave., arranged on a North-South axis. The default location of the Diamond District stop, as stored in main DB 108, is indicated with a five-pointed star 410. The stop-lookup locations of individual entries of the stop-lookup data for the Diamond District stop are schematically shown as small filled circles 502. Stop-lookup locations 502 are schematically displayed together with open circles ("confidence circles") 504 that are each defined by a radius ("confidence radius") associated with each stop-lookup location. The size of confidence circle 504 reflect the level of accuracy of the corresponding stop-lookup location located at the center of the circle—a smaller size corresponds to better accuracy of the stop-lookup location and a larger size corresponds to a less accurate stop-lookup location.

Optionally or additionally, registered stop-lookup data may be further selected based on one or more other data entries comprised in the stop-lookup data, which may include: stop-lookup location; a mobile device ID; transit stop ID; a timestamp; and an accuracy of the stop-lookup location.

Examples of selecting stop-lookup data registered for analysis based on the timestamp include: selecting for stop-lookup data before or after a date of change in bus stop location as dictated by a bus transportation service provider; selecting for stop-lookup data on particular days of the week, for example weekend or weekdays; selecting for stop-lookup data from certain times, for example late night or business hours.

Other examples of selecting stop-lookup data include selecting based on an accuracy of the stop-lookup location. By way of example, the set of registered stop-lookup data may be selected to include only entries of stop-lookup data having a minimum level of accuracy.

In an embodiment of the disclosure, SL crowdsourcing process 300 comprises a block 304 (FIG. 2) comprising spatially clustering the registered stop-lookup locations for the bus stop to identify a plurality of candidate clusters. By way of example, the registered stop-lookup data is loaded into a spatial index optimized to store and query data that represents objects defined in a geometric space. Examples of spatial indices include: R-tree, R+ tree, R* tree, Hilbert R-tree, HHCode, Grid (spatial index), Z-order (curve), Quadtree, Octree, UB-tree, X-tree, kd-tree, and m-tree.

Reference is now made to FIG. 3B. In an embodiment of the disclosure, once stop-lookup data is loaded onto a spatial index, the spatial index is used to spatially cluster the stop-lookup locations. The spatial clustering may be performed with various clustering methods known in the art. Optionally, the spatial clustering method includes Density-Based Spatial Clustering of Applications with Noise (DB-SCAN). Other optional clustering methods include OPTICS (Ordering points to identify the clustering structure) algorithm and hierarchical clustering. For a given set of stop-lookup locations, let the set of clusters having n clusters be designated as consisting of cluster[1], cluster[2], cluster[n]. By way of example, spatial clustering of stop-lookup locations 502 identifies six clusters, indicated as 510-1, 510-2, 510-3, 510-4, 510-5, and 510-6 in FIGS. 3B-3D.

Reference is now made to FIG. 3C. In an embodiment of the disclosure, SL crowdsourcing process 300 comprises a block 305 (FIG. 2) comprising designating cluster centroids as candidate bus stop locations. After the clusters are designated, a centroid of each cluster is determined. The centroid of each of clusters 510-1, 510-2, 510-3, 510-4, 510-5, and 510-6, respectively, are schematically shown as open crosses 520-1, 520-2, 520-3, 520-4, 520-5 and 520-6. Optionally, the centroid is calculated so that stop-lookup location entries that are more accurate (having a shorter confidence radius) are more heavily weighted. By way of example, let each stop-lookup location in a set of stop-lookup data entries in a given cluster be defined as a set of points, each point $p_i$ having an x coordinate $x_i$ and a y coordinate $y_i$, expressed as:

$$p_i=(x_i,y_i) \quad \text{[formula 1]}$$

In addition, let each point $p_i$ be associated with a weight $w_i$ defined as an inverse of the accuracy (confidence radius) associated with the point such that a more accurate stop-lookup location is given more weight, in accordance with the formula:

$$w_i = \frac{1}{\text{accuracy}}. \quad \text{[formula 2]}$$

The cluster centroid C for a set of points $p_i$ (n=1 to i) can be expressed as $$C = (\bar{x}, \bar{y}), \text{ where} \quad \text{[formula 3]}$$

$$\bar{x} = \frac{\sum_{i=1}^{n} x_i \cdot w_1}{\sum_{i=1}^{n} w_i} \text{ and} \quad \text{[formula 4]}$$

$$\bar{y} = \frac{\sum_{i=1}^{n} x_i \cdot w_1}{\sum_{i=1}^{n} w_i}. \quad \text{[formula 5]}$$

In an embodiment of the disclosure, the centroid of each cluster is designated as a candidate bus stop location.

In an embodiment of the disclosure, SL crowdsourcing process 300 comprises a block 306 (FIG. 2) comprising ranking the candidate bus stop locations to determine a winning bus stop location. The candidate bus stop locations may be ranked according to a confidence value indicating a confidence that the candidate bus stop location is the actual location of the bus stop. The above confidence value may be referred to herein as a "location confidence value" or "LCV", and may be a value ranging from 0 indicating minimum confidence and 1 indicating maximum confidence. The LCV for a given candidate bus stop location may be calculated based on at least a portion of the entries comprised in the registered stop-lookup data, optionally all entries comprised in the registered stop-lookup data.

Optionally, the LCV is calculated based on a selection of entries within the registered stop-lookup data having locations that are presumed to co-localize with the candidate bus stop location with a minimum confidence. Optionally, the selection of entries comprises selecting entries in which a circle (which may be referred to as a "confidence circle") defined by the entry's confidence radius and stop-lookup location encompasses the candidate bus stop location. For convenience of presentation, an entry that fulfills this requirement may be referred to herein as a "centered entry" with respect to the candidate bus stop location, and an entry that fails to fulfil this requirement may be referred to as an "deviated entry" with respect to the candidate bus stop location. Also for convenience of presentation, a set of entries determined to the centered entries may be referred to as a "centered entry set" and a set of entries determined to the deviated entries may be referred to as a "deviated entry set".

Figure 4:
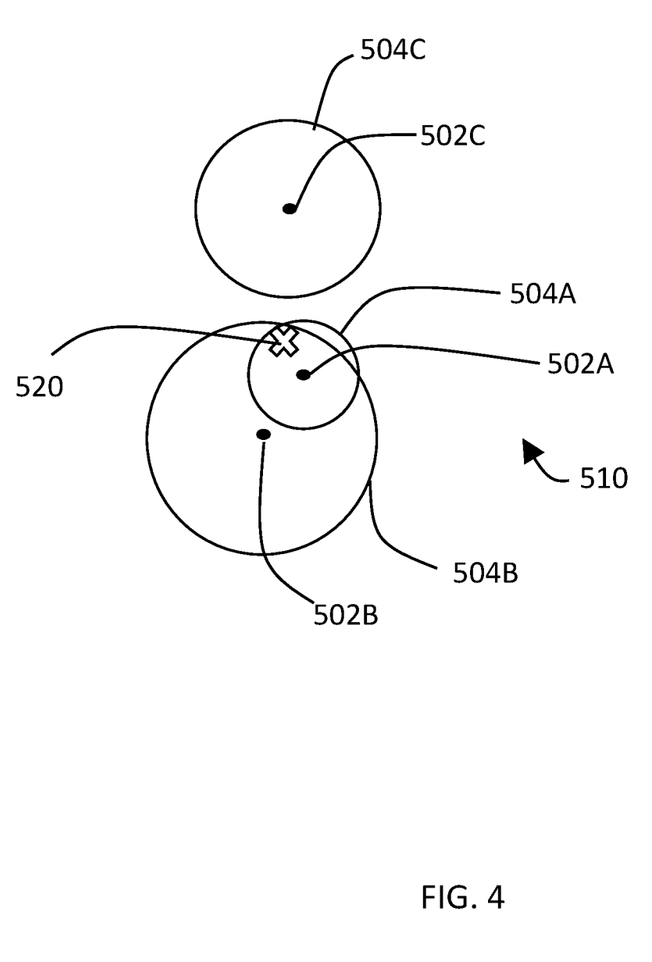
FIG. 4 schematically shows examples of centered and deviated entries of stop-lookup data, as used in a SL crowdsourcing method in accordance with an embodiment of the disclosure.

Reference is made to FIG. 4, showing stop-lookup locations of an example cluster 510. Stop-lookup location 502A and a confidence circle 504A correspond to a centered entry, in which confidence circle 504A encompasses a centroid 520 of a cluster. Stop-lookup location 502A and confidence circle 504B also correspond to a centered entry. By contrast, stop-lookup location 502C and a confidence circle 504C correspond to a deviated entry, in which confidence circle 504C fails to encompass centroid 520.

In an embodiment of the disclosure, the LCV for a candidate bus stop location may be based on one or more "specialized LCVs" calculated from at least a portion of the registered stop-lookup data.

Optionally, a first specialized LCV ("LCVdevice") is calculated based on a count of unique mobile devices in a centered entry set for a candidate bus stop location relative to the total count of unique mobile devices in the registered stop-lookup data set, such that a candidate bus stop location having a centered entry set with a high count of unique devices has a high LCVdevice. Optionally, LCVdevice is a value between 0 and 1, with 0 reflecting no devices and 1 reflecting a high count of unique devices. By way of example, the LCVdevice may be a value based on the count of unique mobile devices (by way of example mobile devices 200 shown in FIG. 1) in the centered entry set divided by the total count of unique devices in the set of registered stop-lookup data entries. The count of unique mobile devices can be determined using the device ID comprised in the stop-lookup data. By way of numerical example, let a registered stop-lookup dataset consist of 1000 entries received from 100 unique devices. With respect to a first candidate bus stop location, 300 entries are deviated entries received from 75 unique devices, and 700 entries are centered entries received from 25 unique devices. In such an example, the LCVdevice for the cluster equals 25/100, which is 0.25. The LCVdevice of a second candidate bus stop location, having centered entries that are received from 40 unique devices out of the 100 unique devices in the registered stop-lookup dataset, would equal 40/100, which is 0.4. As such, the second candidate bus stop location has a higher LCVdevice, and thus a higher confidence that it is the actual location of the bus stop. Optionally, the LCVdevice is calculated as a weighted average, in which devices that are located farther from the candidate bus stop location, or devices associated with an entry having a worse accuracy, is assigned a lower weight and thus contribute less to the average compared to devices are located closer to the candidate bus stop location.

Additionally or alternatively, a second specialized LCV ("LCVdistance") is based on an accuracy of the confidence radius of the entries in a centered entry set with respect to a candidate bus stop location, such that a candidate bus stop location with a centered entry set with high average accuracy has a high LCVdistance. Because a high confidence radius value corresponds to low accuracy and a low confidence radius value corresponds to high accuracy, an inverse of the confidence radius value may be used as a measure of accuracy. As such, LCVdistance may be based on a sum of the inverse of the confidence radius for each centered entry for a candidate bus location divided by a sum of the inverse of the confidence radius for all entries in the registered stop-lookup dataset. Calculated in such a way, the LCVdistance would have a value between 0 and 1, and candidate bus stop locations in which the centered entries tend to have better accuracy of its stop-lookup location tends to have a higher LCVdistance value compared to other candidate bus stop locations.

By way of numerical example, let a registered stop-lookup data set consist of 1000 entries, and let an average confidence radius of 300 centered entries for a first candidate bus location be 2 meters and the average confidence radius of all 1000 entries in the dataset be 5 meters. In such an example, the LCVdistance for the first candidate bus location equals 150 (300 entries×½) divided by 200 (1000 entries×⅕), which is 0.75. A second candidate bus stop location having centered entries with a longer confidence radius would have a smaller LCVdistance. By way of a second numerical example, let a second candidate bus stop location have 300 centered entries having an average confidence radius of 6 meters, which is less accurate than the average confidence radius of 5 for all entries in the registered dataset. LCVdistance for the second candidate bus stop would be 50 (300 entries×⅙) divided by 200 (1000 entries× ⅕), which is 0.25. As such, with respect to LCVdistance, the first candidate bus stop location has a higher confidence that it is the actual location of the bus stop compared to the second candidate bus stop location. Optionally, an average confidence radius for deriving the LCVditance is calculated as a weighted average, in which the contribution of a radius confidence of a given entry is weighted in accordance with the distance of the device location from the candidate bus stop, such that a confidence radius of a device located farther from the candidate bus stop location contributes less to the average compared to the confidence radius of devices located closer to the candidate bus stop location.

Additionally or alternatively, a third specialized LCV ("LCVtime") is based on a count of days that include a centered entry relative to the total count of days covered in the entries of the stop-lookup dataset comprised in the cluster. The count of days can be determined using the timestamp comprised in the stop-lookup dataset. As such, LCVtime may be based on a count of days comprising a centered entry for a candidate stop-lookup location, divided by a count of all the days covered in the stop-lookup dataset. By way of numerical example, let a first candidate bus stop be registered with 1000 entries collected over seven days, out of which five days include at least one centered entry. In such an example, the LCVtime for a first candidate bus stop location would be 5 divided by 7, which is 0.714. In a second numerical example, let a second candidate bus stop location be registered with 500 entries collected over seven days, out of which two days include at least one centered entry. The LCVtime for the second candidate bus stop location would be 2 divided by 7, which is 0.285. As such, with respect to LCVtime, the first candidate bus stop location has a higher confidence that it is the actual location of the bus stop compared to the second candidate bus stop location. Optionally, the LCVtime is calculated as a weighted average, in which devices that are located farther from the candidate bus stop location are assigned a lower weight and thus contribute less to the average compared to devices that are located closer to the candidate bus stop location.

In an embodiment of the disclosure, a LCV may be based on one or more of LCVdevice, LCVdistance and LCVtime. Optionally, a LCV may be a weighted average of one or more of LCVdevice, LCVdistance and LCVtime. In a numerical example, LCV=a(LCVdevice)+b(LCVdistance)+ c(LCVtime), where a+b+c=1.

Optionally, after the LCV is calculated for each cluster comprised in a set of registered stop-lookup data, the candidate bus stop locations are ranked based of their respective LCV. Optionally, the cluster with the highest LCV is designated as the stop-lookup data set's "winning" candidate bus stop location—the location presumed to reflect the location of the bus stop corresponding to the bus stop ID against which the entries comprised in the stop-lookup data set was selected.

By way of numerical example, let the candidate bus stop locations shown in FIG. 3C be determined to have the following LCVs:

TABLE 1

| Centroid | LCV |
| --- | --- |
| 520-1 | 0.21 |
| 520-2 | 0.44 |
| 520-3 | 0.22 |
| 520-4 | 0.37 |
| 520-5 | 0.82 (winning) |
| 520-6 | 0.16 |

Out of the six candidate bus stop locations, cluster 510-5 has the highest LCV of 0.82, and centroid 520-5 of cluster 510-5 is thus designated in the example as the winning candidate bus stop location.

In an embodiment of the disclosure, SL crowdsourcing method 300 further comprises a block 308 (FIG. 2) comprising assessing if parameters of the winning candidate bus stop location meet at least one of or optionally all threshold criteria disclosed below, for accuracy of data and/or likelihood of the winning candidate bus stop location reflecting the actual stop location. Optionally, if parameters of the winning candidate bus stop location meets threshold criteria, the winning candidate bus stop location is designated as an updated bus stop location. By way of example, let a centroid of a given cluster of stop-lookup locations be designated as a winning candidate bus stop location (block 310). If parameters of the winning candidate bus stop location do not meet the at least one threshold criteria, the bus stop location is not updated (block 312). In an embodiment of the disclosure, the parameter of the winning candidate bus stop location is based on its LCV.

Optionally, a first threshold criterion for a winning candidate bus stop location to qualify as an updated bus stop location is that the winning candidate bus stop location's LCV must be higher than the LCV of the second-ranked candidate bus stop location by at least a predetermined minimum difference value. The first threshold criterion contributes to ensuring that the stop-lookup entries of the winning candidate bus stop location reflects the location of the bus stop substantially better than all of the other candidate bus stop locations. By way of numerical example, let the minimum difference value be 0.3. In such a case, the winning candidate bus stop location 520-5 shown in FIG. 3C having a LCV of 0.82 may qualify to be an updated bus stop location because the LCV of the second-ranked candidate bus stop location 520-2 is 0.44, such that the difference between the respective LCVs of winning candidate bus stop locations 520-5 and 520-2 is greater than the minimum difference value of 0.3.

Additionally or alternatively, a second threshold criterion is that the winning candidate bus stop location's LCV must be higher, at least by a predetermined minimum difference value, than a LCV ("original bus stop LCV") calculated using the original location of the same bus stop as identified in accordance with a bus stop ID, by way of example as stored in main DB 108 prior to the start of the SL crowdsourcing process, as a candidate bus stop location. The second threshold criterion contributes to ensuring that the winning candidate bus stop location reflects the actual current location of the bus stop substantially better than the previously established location of the same bus stop. By way of numerical example, let an original bus stop LCV, calculated with respect to the registered stop-lookup dataset and previously established bus stop location stored in main DB 108, have a value of 0.08. In such a case, the winning candidate bus stop location 520-5 having a LCV of 0.82 may qualify to be the updated bus stop location.

Additionally or alternatively, a third threshold criterion is that, on average, the location of the entries included in the cluster whose centroid was designated as the winning candidate bus stop location is sufficiently accurate. Optionally, the average confidence radius value (which may be referred to as "cluster accuracy" or "$C_{accuracy}$") of the stop-lookup data entries included in the cluster whose centroid was designated as the winning candidate bus stop location is below a maximum value. As such, a winning candidate bus stop location may not qualify to be an updated bus stop location if the stop-lookup locations included in the cluster defining the winning candidate bus stop location do not have sufficient cluster accuracy according to an objective standard. By way of numerical example, a winning candidate bus stop location may not qualify as an updated bus stop location if the cluster accuracy of the entries in the cluster is above 15 meters.

The cluster accuracy may be calculated as follows. For a given cluster having a centroid C having coordinates:

$$C=(\bar{x},\bar{y}) \quad \text{[formula 3]},$$

cluster accuracy (C accuracy) of the cluster may be calculated as a weighted average of the Euclidean distance dist(C. $p_i$) between the location of the cluster centroid C and each point $p_i$ in the cluster, with the Euclidean distance for each point $p_i$ being weighted with weight $w_i$ in accordance with the point's accuracy, in accordance with the formula:

$$C_{accuracy} = \sqrt{\frac{\sum_{i=1}^{n} dist(c, p_i)^2 \cdot w_i}{\frac{n}{n-1} \cdot \sum_{i=1}^{n} w_i}} \quad \text{[formula 6]}$$

Additionally or alternatively, a fourth threshold criterion is that a Euclidean distance between the winning candidate bus stop location and the current bus stop location should above a certain threshold. As such, a winning candidate bus stop location may not qualify to be an updated bus stop location if there is no appreciable difference between the two locations.

In an embodiment of the disclosure, the winning candidate bus stop location is designated as the updated bus stop location, upon fulfilling the first, second, third, and fourth threshold criteria.

Figure 3D:
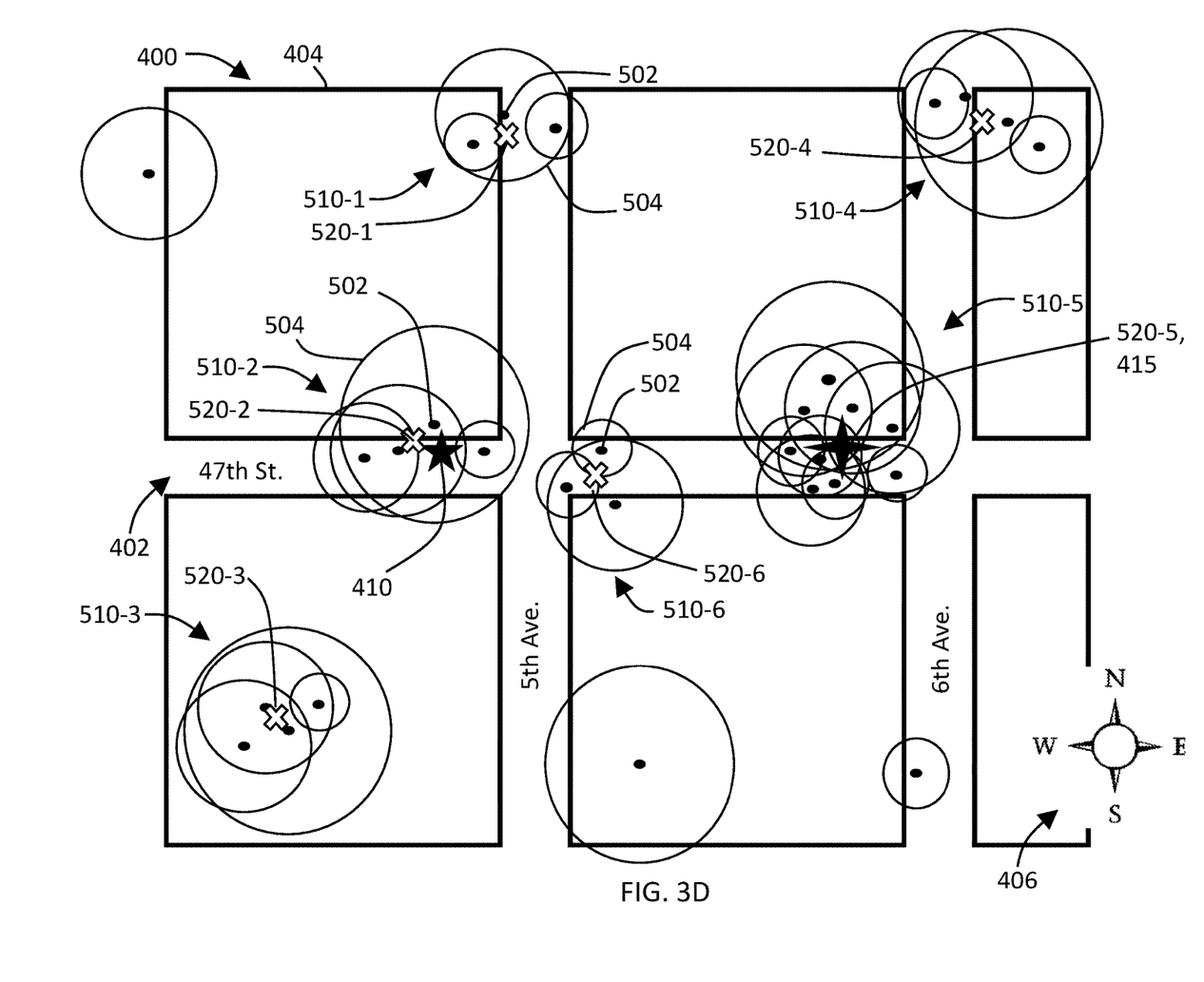

By way of example, as shows in FIG. 3D, winning candidate bus stop location 520-5 fulfills the first, second, third, and fourth threshold criteria and is thus designated to be the updated bus stop location for the Diamond District stop, which is schematically indicated by a four-pointed star 415.

The third and fourth criteria described above do not require that the LCV of the candidate bus stop locations be first determined. As such, the third and fourth criteria may be applied at block 304 or block 305 to eliminate clusters prior to ranking the clusters based on LCV in accordance with block 306. As such, clusters that lack a threshold level of cluster accuracy, or clusters whose centers are not sufficiently distant from the previous bus stop location may be removed from consideration even before their respective LCV is determined.

Reference is made back to FIG. 1. In an embodiment of the disclosure, designation of a bus stop location and an updated bus stop location by SL engine 106 triggers updating the location of the bus as stored in main DB 108 and/or transmitting the updated bus stop location to a bus transportation service provider that makes use of the bus stop.

Reference is made back to FIG. 2. In an embodiment of the disclosure, SL crowdsourcing process 300 comprises a block 314 comprising, if the winning candidate bus stop location is determined to not meet threshold criteria as described with respect to block 308, transmitting instructions to mobile devices to transmit more accurate stop-lookup locations for the bus stop.

Reference is made back to FIG. 1. In an embodiment of the disclosure, if SL engine 106 analyzes stop-lookup data for a given bus stop, but the resulting stop-lookup data does not produce a cluster that qualifies to provide an updated bus stop location in light of block 308, then SL engine 106 transmits "location boost" instructions to mobile devices 200 to subsequently provide more, or more accurate, location-based data relevant to the given bus stop. Optionally, the mobile device ID comprised in the stop-lookup data set may be used so that the instructions are sent to the mobile phone that previously transmitted stop-lookup data for the given bus stop. As such, the instructions may be sent only to a subset of mobile devices operating transit app 220 and operable to communicate with SL crowdsourcing system 100. Optionally, a "location boost area", which may include a city or neighborhood that is determined based on the stop-lookup locations in the registered stop-lookup data set, and the location boost instructions are transmitted to all mobile devices that have previously transmitted stop-lookup locations located in the location boost area.

In an embodiment of the disclosure, the location boost instructions may comprise instructing certain mobile devices 200 to activate its GPS receiver, optionally when a user instructs the mobile device to access information for the given bus stop. Alternatively or additionally, the location boost instructions may comprise requesting location data from other sources, such as from location-tracking equipment on buses.

In the description and claims of the present application, the term "average", unless otherwise specified, is understood to be a result of one of any type of averaging methods known in the art, including but not limited to: mean, mode, median, or weighted average.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method for determining a location of a transit stop for a transit system, the method comprising:
    registering a plurality of entries of device location data of a plurality of mobile computing devices, each entry of the plurality of entries comprising a geographical coordinate of a mobile computing device at a time the mobile computing device displayed information relating to the transit stop; and
    determining a transit stop location responsive to the registered entries of device location data.

2. The method according to claim 1, wherein displaying information relating to the transit stop comprises displaying a page dedicated to providing information for the transit stop, the page comprising one or more of: a location of the transit stop; a list of vehicles scheduled to stop at the transit stop; and scheduled arrival times for the vehicles.

3. The method according to claim 2, wherein the information relating to the transit stop comprises real-time information comprising one or more of: a real-time location of the computing device with respect to the transit stop location; a real-time list of vehicles that are expected to stop at the transit stop; and real-time estimated arrival times for the vehicles.

4. The method according to claim 1, wherein the device location data for each mobile device further comprises one or more of: an ID of the mobile device, an ID of the bus stop for which information was displayed on the mobile device; a timestamp; and an accuracy of the geographical coordinate.

5. The method according to claim 4, wherein determining the transit stop location comprises:
    clustering the registered entries in accordance with each entry's respective geographical coordinate to identify clusters; and
    determining a centroid for each of the clusters and designating each centroid as a candidate transit stop location;
    determining a confidence value for each candidate transit stop location, the confidence value being responsive to one or more parameters of a plurality of selected entries selected from the plurality of registered entries, which are presumed to co-localize with the candidate transit stop location;
    ranking the plurality of candidate transit stop locations in accordance with the respective confidence values to determine a winning candidate transit stop location; and
    designating the winning candidate transit stop location as the transit stop location.

6. The method according to claim 5, wherein the plurality of selected entries are selected by:
    determining for each of the plurality of registered entries a confidence circle having a center and a radius, the center being based on the respective entry's geographic coordinate and the radius being based on the respective entry's accuracy, wherein high accuracy corresponds to a short radius and low accuracy corresponds to a long radius;
    selecting, as selected entries, registered entries having a confidence circle that encompasses the candidate stop location.

7. The method according to claim 5, wherein the confidence value is responsive to one or more of:
    a count of unique mobile device IDs in the plurality of selected entries relative to the total count of unique mobile device IDs in the plurality of registered entries;
    an average accuracy of the selected entries; and
    a count of days included in the plurality of selected entries relative to the total count of days included in the plurality of registered entries.

8. The method according to claim 5, wherein the winning candidate transit stop location is not designated as the transit stop location unless the winning candidate stop location meets one or more threshold criteria selected from the following:
    the confidence value of the winning candidate transit stop location is higher than the confidence value of the second-ranked candidate transit stop location by at least predetermined minimum difference value;
    the confidence value of the winning candidate transit stop location is higher than a confidence value calculated using an original geographical coordinate of the transit stop as a candidate transit stop location by at least a predetermined minimum difference value;

an average location accuracy of the set of registered entries included in the cluster whose centroid was designated as the winning candidate transit stop location meets or exceeds a predetermined value; and a Euclidean distance between the winning candidate transit stop location and a default transit stop location is above a predetermined threshold.

9. The method according to claim 8, wherein the winning candidate transit stop location is not designated as the transit stop location unless the winning candidate stop location meets all of the threshold criteria.

10. The method according to claim 8, further comprising sending, in response to the winning candidate stop location not meeting the one or more threshold criteria, instructions to mobile devices operable to provide, for the transit stop, more entries of device location data and/or entries having better accuracy of geographical coordinates.

11. A system for determining a location of a transit stop for a transit system, the system comprising:

a communication module operable to receives a plurality of entries of device location data from a plurality of mobile computing devices, each entry of the plurality of entries comprising a geographical coordinate of a mobile computing device at a time the mobile computing device displayed information relating to the transit stop;

a crowd data memory that stores the device location data received by the communication module; and a microprocessor operable, responsive to a set of instructions stored in a memory, to:

register device location data stored in the crowd data memory that relates to the transit stop; and determine a location of the transit stop responsive to the registered entries of the device location data.

12. The system according to claim 11, wherein displaying information relating to the transit stop comprises displaying a page dedicated to providing information for the transit stop, the page comprising one or more of: a location of the transit stop; a list of vehicles scheduled to stop at the transit stop; and scheduled arrival times for the vehicles.

13. The system according to claim 12, wherein the information relating to the transit stop comprises real-time information comprising one or both of: a real-time location of the computing device with respect to the transit stop location; a real-time list of vehicles that are expected to stop at the transit stop; and real-time estimated arrival times for the vehicles.

14. The system according to claim 11, wherein the device location data for each mobile device further comprises one or more of: an ID of the mobile device, an ID of the bus stop for which information was displayed on the mobile device; a timestamp; and an accuracy of the geographical coordinate.

15. The system according to claim 14, wherein determining the transit stop location comprises:

clustering the registered entries in accordance with each entry's respective geographical coordinate to identify clusters; and determining a centroid for each of the clusters and designating each centroid as a candidate transit stop location;

determining a confidence value for each candidate transit stop location, the confidence value being responsive to one or more parameters of a plurality of selected entries selected from the plurality of registered entries, which are presumed to co-localize with the candidate transit stop location;

ranking the plurality of candidate transit stop locations in accordance with the respective confidence values to determine a winning candidate transit stop location; and designating the winning candidate transit stop location as the transit stop location.

16. The system according to claim 15, wherein the plurality of selected entries are selected by:

determining for each of the plurality of registered entries a confidence circle having a center and a radius, the center being based on the respective entry's geographic coordinate and the radius being based on the respective entry's accuracy, wherein high accuracy corresponds to a short radius and low accuracy corresponds to a long radius;

selecting, as selected entries, registered entries having a confidence circle that encompasses the candidate transit stop location.

17. The system according to claim 15, wherein the confidence value is responsive to one or more of:

a count of unique mobile device IDs in the plurality of selected entries relative to the total count of unique mobile device IDs in the plurality of registered entries;

an average accuracy of the selected entries; and a count of days included in the plurality of selected entries relative to the total count of days included in the plurality of registered entries.

18. The system according to claim 15, wherein the winning candidate transit stop location is not designated as the transit stop location unless the winning candidate stop location meets one or more threshold criteria selected from the following:

the confidence value of the winning candidate transit stop location is higher than the confidence value of the second-ranked candidate transit stop location by at least predetermined minimum difference value;

the confidence value of the winning candidate transit stop location is higher than a confidence value calculated using an original geographical coordinate of the transit stop as a candidate transit stop location by at least a predetermined minimum difference value;

an average location accuracy of the set of registered entries included in the cluster whose centroid was designated as the winning candidate transit stop location meets or exceeds a predetermined value; and a Euclidean distance between the winning candidate transit stop location and a default transit stop location is above a predetermined threshold.

19. The system according to claim 18, wherein the winning candidate transit stop location is not designated as the transit stop location unless the winning candidate transit stop location all of the threshold criteria.

20. The system according to claim 18, wherein the microprocessor, in response to the winning candidate transit stop location not meeting the one or more threshold criteria; is operable to generate instructions to mobile devices to provide, for the transit stop, more entries of device location data and/or entries having better accuracy of geographical coordinates.

* * * * *